United States Patent [19]

Gauer

[11] 4,415,052
[45] Nov. 15, 1983

[54] ENGINE COMPARTMENT ENCLOSURE

[75] Inventor: Larry C. Gauer, Dubuque, Iowa

[73] Assignee: Deere & Company, Moline, Ill.

[21] Appl. No.: 300,339

[22] Filed: Sep. 8, 1981

[51] Int. Cl.³ .............................................. B62D 25/12
[52] U.S. Cl. ............................... 180/69 R; 180/89.17; 292/103
[58] Field of Search .......................... 180/69 R, 89.17; 292/204, 147, 273, 275, 277, 103

[56] References Cited

U.S. PATENT DOCUMENTS

| | | | |
|---|---|---|---|
| 1,102,229 | 7/1914 | Ballou | 180/69 R |
| 1,387,407 | 8/1921 | King | 180/69 R |
| 3,743,045 | 7/1971 | Hansen | 180/69 R |
| 3,826,327 | 12/1972 | Stover | 180/69.1 |
| 3,863,729 | 4/1974 | Fummetti et al. | 180/69 R |
| 3,865,210 | 4/1974 | Von Fummetti | 180/69 R |
| 3,913,701 | 8/1973 | Williams | 180/90 |
| 4,037,682 | 2/1976 | Sandrock et al. | 180/69 R |
| 4,071,107 | 9/1976 | Leighty | 180/69 R |

FOREIGN PATENT DOCUMENTS

| | | | |
|---|---|---|---|
| 1241292 | 5/1967 | Fed. Rep. of Germany | 180/69 R |
| 121372 | 4/1948 | Sweden | 292/273 |

Primary Examiner—Joseph F. Peters, Jr.
Assistant Examiner—Timothy Roesch

[57] ABSTRACT

An engine having top, side shields and opposite ends operatively enclosing an engine. Each side shield has displaceable panel including a first panel hingedly supported from the enclosure top extending downward, and a second panel hingedly supported from the lower edge of the first panel. The lower edge of the second panel abuts the bottom of the enclosure. A restraining means for supporting and generally maintaining the second panel co-planar with the first panel in a first position and generally parallel and opposite to the first panel in a second position.

4 Claims, 4 Drawing Figures

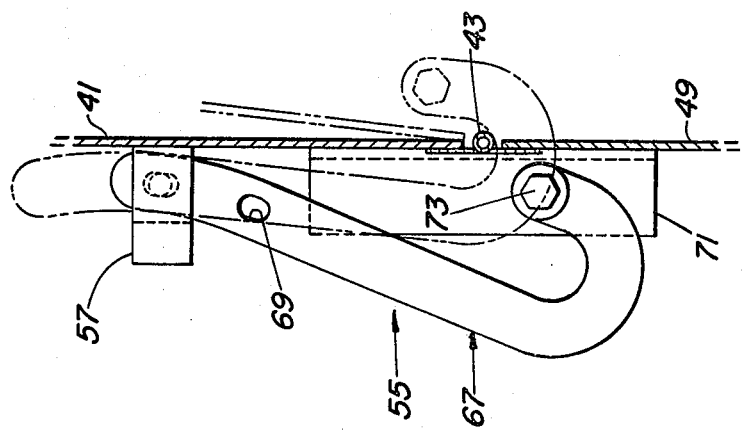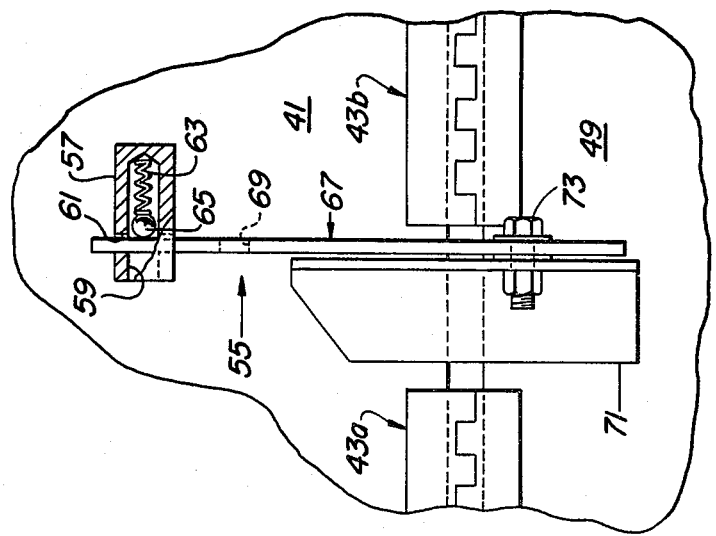

ENGINE COMPARTMENT ENCLOSURE

BACKGROUND OF THE INVENTION

This invention concerns engine compartment enclosures and more particularly engine compartment enclosures including displaceable side panels.

Motor vehicles have received increasing attention in an effort to reduce the noise level associated with operating the vehicle. For example, it is common practice to completely enclose the engine compartment of an off-road vehicle. It is well known to provide side panels to the enclosure to allow access to the interior of the engine compartment. Because these vehicles require frequent engine servicing, continued attention has been directed to provide a side panels which are easily displaceable for engine access. Such efforts are exemplified by U.S. Pat. Nos. 3,863,729; 3,743,045; 3,865,210; 3,913,701; 3,826,327; 4,071,107; and 4,037,682. The side panel construction as exemplified by the aforecited patents do not render a completely satisfactory solution, especially when high floatation tires are employed on an off-road vehicle.

SUMMARY OF THE INVENTION

It is an objective of the present invention to present a vehicle engine enclosure having displaceable side panels which are readily displaceable and are simply constructed. It is a further objective of the present invention to present a displaceable side panel which is compatible with vehicles containing high floatation tires.

BRIEF DESCRIPTION OF THE DRAWINGS

FIG. 3 is a frontal view of a retaining assembly, ib accordance with the present invention.

FIG. 4 is a side elevational view of the retaining assembly.

DETAILED DESCRIPTION OF THE PREFERRED EMBODIMENT

Figure 1:
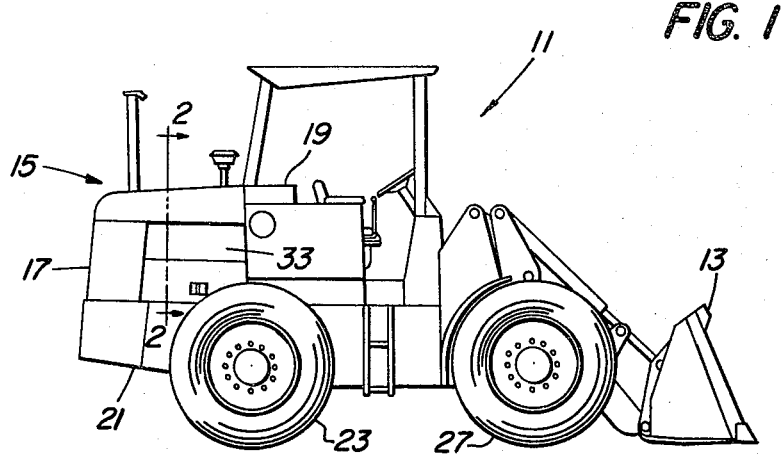
FIG. 1 is a side elevated view of a wheeled loader having a rear mounted engine.

Referring now to FIG. 1 there is shown an earthmoving vehicle or construction machine 11, referred to in the industry as a front-end or wheel loader. The wheel loader 11 includes a loading bucket 13 at the front end of the vehicle, and a rearmounted engine which supplies power to a loader and bucket as well as functioning as a counter weight during machine operation. The engine (not shown) is enclosed within a compartment or soundsuppressing enclosure 15 which suppresses engine noise while permitting adequate air flow to provide engine cooling.

The enclosure 15 is supported on the wheel loader 11 between a radiator shroud 17 and the vehicle cab 19. The radiator shroud 17, supported from the vehicle by frame 21, encloses a portion of a radiator (not shown) to protect the radiator from damage during machine operation and to enclose a radiator fan used to effect air cooling through the radiator for engine cooling. The enclosure 15 is preferably of two symmetric portions with reference to the longitudinal center line of the vehicle 11. The vehicle rides on rear tires 23 and forward tires 27.

Figure 2:
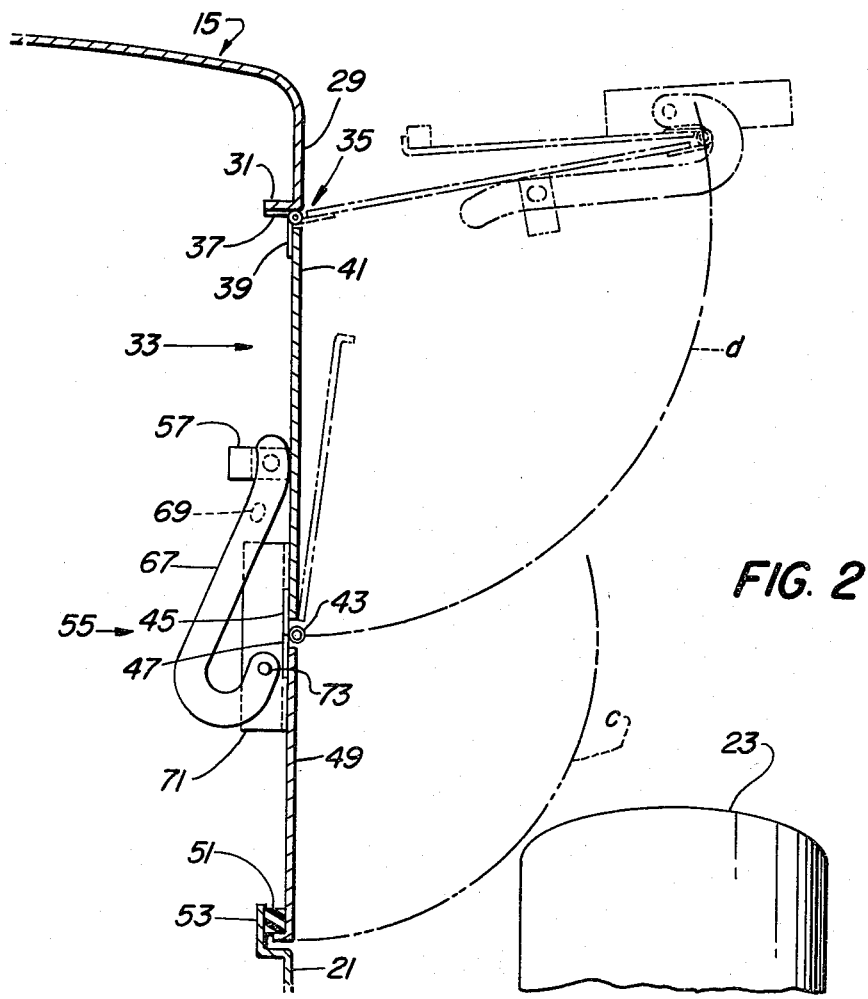
FIG. 2 is a partial section elevated view of the engine compartment and a side panel.

Referring to FIG. 2 the enclosure 15 has a top hood 29 containing a rim portion 31. It is observed that the hood portion 29 curves to form a portion of the side wall. An access door 33 forms a portion of the side wall. The access door 33 is comprised of a first conventional hinge joint 35 having a first arm 37 fixably mounted to rim 31 by any conventional means. The second arm 39 of the hinge joint 35 is fixably mounted to a first panel 41. A second hinge joint 43 is divided into two sections 43a and 43b (refer to FIG. 3) as the first arms 45 are fixably mounted to the first plate 41. The second arms 47 of hinge joint 43 are fixably mounted to a second plate 49. The hinge joint 43 connects the lowermost edge of the first plate 41 to the uppermost edge of the second plate 49. The second plate 49 has fixably mounted along its lowermost edge an elastomer stop 51. The frame member 21 has extending along its mating edge to stop 51, a formed L-sloped rim to receive the stop 51 of the first panel 49.

A retaining assembly 55 communicates with the first and second panels 41 and 49 respectively to allow the second panel 49 to pivot about hinge 43 to assume a second position generally parallel to the first panel 41 along sweep path C whereafter both panels can be displaced to rotate about the hinge joint 35 to assume a second position along sweep path D. It is observed from FIG. 2 that when high floatation tires are used, such as 23, the second panel 49 journeys along sweep path C to clear the tire 23.

Referring more particularly to FIG. 3 and 4, the retaining assembly 55 which permits the second panel 49 to pivot and a second position includes a block member 57 fixably mounted to the first panel 41. The block member 57 includes a horizontal bore 59 and a vertical slot 61. Within the horizontal bore 59 is placed a spring 63 biased by the end wall of the bore 59. The spring 63 biases a ball 65 within the bore 59. A J-member 67 has a stem portion extending within the slot 61 of the block 57. A hole 69 is placed within the stem of the J-member 67. The curved portion of the J member is rotatably mounted to a mounting member 71 which is fixably mounted by any conventional means to the second panel 49. The J member being connected to the mounting member 71 at 73. It is observed that the location of the curved portion of the J-member is just below the hinge 43 in a first position to allow the second panel 49 to rotate along sweep path C displacing the J member horizontally relative to the hinge joint 43 and vertically. During vertical displacement of the J-member 67, the hole 69 receives a portion of the ball 65 securing the J member 67 in a horizontally displaced position thereby restraining the second panel 49 in a generally parallel position to the first panel 41. The first panel 41 carrying panel 49 can then be pivoted about hinge 35.

While the invention has been described with reference to a preferred embodiment, it will be understood by those skilled in the art that various changes may be made and equivalent may be substituted for elements thereof without departing from the scope of the invention. In addition, any modifications may be made to adapt a particular situation or material to the teachings of the invention without departing from the central scope thereof. Therefore, it is intended that the invention not be limited to the particular embodiment disclosed as the best mode contemplated for carrying out this invention, but that the invention will include all embodiments that fall within the scope of the appended claims.

I claim:

1. In an engine enclosure having a top, side shields and opposite ends operatively enclosing an engine, the improvement comprising:
- a first panel hingedly supported from the enclosure top and extending downwardly therefrom to form a portion of the enclosure side;
- a first hinge means joining said panel to the enclosure top for pivotal movement relative thereto;
- a second hingedly supported panel, forming another portion of the enclosure side, extending downwardly from said first panel with an edge of said second panel spaced from the lowermost side edge of enclosure side;
- a second hinge means joining said second panel to said first panel for pivotal movement relative thereto;
- a restraining means for supporting and generally maintaining said second panel co-planer with said first panel in a first position and generally parallel and opposite to said first panel in a second position including,
- a mounting brace fixably mounted to said second panel;
- a J-member having a general J configuration, having its lower curved portion pivotably mounted to said mounting brace to allow said curved portion to pass below said first panel such that the stem of said member has a generally vertical extension;
- means for maintaining said stem of said J-member in close proximity to said first panel to allow said stem vertical motion, and for restraining motion of said J-member when said second panel is in a second position.

2. An apparatus as claimed in claim 1 wherein said means comprises a block member fixably mounted to said first panel having a generally vertically extending slot therethrough and a generally horizontally extending bore intercepting said slot; said stem extending through said slot; a spring placed in said bore; a ball placed in said slot biased by said spring and said stem; said stem having a hole to partically receive said ball when said second panel assumes said second position.

3. In an engine having a top, side shields and opposite ends operatively enclosing an engine, the improvement comprising:
- a first panel hingedly supported from the enclosure top and extending downwardly therefrom to form a portion of the enclosure side;
- a first hinge means joining said panel to the enclosure top for pivotal movement relative thereto;
- a second hinge means hingedly supported panel, forming another portion of the enclosure sid, extending downwardly from said first panel with an edge of said second panel spaced from the lowermost side edge of the enclosure side;
- a second hinge means joining said second panel to said first panel for pivotal movement relative thereto;
- a mounting brace fixably mounted to said second panel;
- a J-member having a generally J configuration, having its lower curved portion rotatably mounted to said mounting brace to allow said curved portion to pass below said first panel and such that the stem of said J-member has a generally vertical extension;
- a block member fixably mounted to said first panel having a vertically extending slot therethrough and a generally horizontal extending bore intercepting said slot; said stem extending through said slot;
- a spring placed in said bore wall;
- a ball placed in said slot biased by said spring and;
- said stem having a hole to partcularly receive said ball when said second panel assumes said second position.

4. An apparatus of claim 3 wherein said lowermost edge of said enclosure has an L-shaped rim, an elastomer material fixably mounted in said rim to abut the lowermost edge of said second panel.

* * * * *